United States Patent [19]
Stephenson, III

[11] Patent Number: 5,884,765
[45] Date of Patent: Mar. 23, 1999

[54] INDEX PRINT SHEET CAPABLE OF STORING FILM MEDIUM

[75] Inventor: Stanley Ward Stephenson, III, Spencerport, N.Y.

[73] Assignee: Eastman Kodak Company, Rochester, N.Y.

[21] Appl. No.: 584,908

[22] Filed: Jan. 11, 1996

[51] Int. Cl.[6] ................................................. B65D 85/48
[52] U.S. Cl. .............................. 206/455; 40/704; 281/31
[58] Field of Search .................................. 206/454, 455, 206/449, 473; 281/31; 40/701, 704, 775, 776

[56] References Cited

U.S. PATENT DOCUMENTS

| | | | |
|---|---|---|---|
| 1,233,076 | 7/1917 | Lowenstein . | |
| 2,871,601 | 2/1959 | Warnow | 40/775 |
| 4,263,357 | 4/1981 | Holson | 40/776 |
| 4,361,974 | 12/1982 | Wood . | |
| 5,000,319 | 3/1991 | Mermelstein | 40/704 |
| 5,259,504 | 11/1993 | Manico | 206/455 |
| 5,263,579 | 11/1993 | Blackman | 206/455 |
| 5,301,803 | 4/1994 | Hansen et al. . | |
| 5,314,066 | 5/1994 | Gresh . | |
| 5,374,975 | 12/1994 | Amat | 206/455 |
| 5,402,881 | 4/1995 | Manico . | |
| 5,431,449 | 7/1995 | Arimoto et al. . | |
| 5,436,694 | 7/1995 | Ishikawa et al. | 40/704 |
| 5,459,549 | 10/1995 | Barr | 206/455 |

*Primary Examiner*—Paul T. Sewell
*Assistant Examiner*—Nhan T. Lam
*Attorney, Agent, or Firm*—Roger A. Fields

[57] ABSTRACT

A film package comprises a film sheet having a series of images recorded on one side of the film sheet and a non-image area on the same side, an index print sheet having a series of pictures printed on one side of the index print sheet which match the series of images recorded on the film sheet and a non-picture area on the same side of the index print sheet in the same relative location as the non-image area on the film sheet and being sized to permit the film sheet to be placed over the non-picture area without covering any of the pictures, and a holder on the non-picture area of the index print sheet for releasably securing the film sheet to the index print sheet.

3 Claims, 1 Drawing Sheet

5,884,765

INDEX PRINT SHEET CAPABLE OF STORING FILM MEDIUM

FIELD OF THE INVENTION

The invention relates generally to the field of photography, and in particular to an index print sheet on which is printed a series of pictures that match a series of images recorded on a film medium. More specifically, the invention relates to an index print sheet that is capable of storing or holding the film medium.

BACKGROUND OF THE INVENTION

Generally, a photographic processing laboratory gives the customer a processed negative film and corresponding photographs which are enlarged and printed from the film. The negative film is usually cut into several equal length sections, each one containing the same number of negatives and inserted in an open-ended sheath or sleeve. Many customers store the photographs in an album apart from the negatives, making it difficult to later find a particular negative for which re-prints are desired.

Index print sheets have been proposed which make it easier to find the sought-after negative. An index print sheet has printed on it several rows of pictures that match the negatives. The pictures are considerably smaller than the photographs and are numbered in accordance with the numbering of the negatives as shown in prior art U.S. Pat. Nos. 5,263,579, issued Nov. 23, 1993 and No. 4,966,285, issued Oct. 30, 1990. Typically, the index print and the negatives are stored together in some fashion. For example, see prior art U.S. Pat. Nos. 5,431,449, issued Jul. 11, 1995, No. 5,402,881, issued Apr. 4, 1995, No. 5,314,066, issued May 24, 1994, and No. 5,301,803, issued Apr. 12, 1994.

SUMMARY OF THE INVENTION

According to one aspect of the invention, a film storing sheet comprising an index print sheet provided with a series of pictures printed on one side of the index print sheet which match a series of images recorded on a film medium, is characterized in that:

the index print sheet has a non-picture area on the one side that does not include any of the pictures printed on the same side and is sized to permit the film sheet to be placed over the non-picture area without covering any of the pictures; and holding means is disposed on the non-picture area for securing the film medium to the index print sheet, but permitting the film medium to be released in order to separate it from the index print sheet.

According to another aspect of the invention, a film package comprises:

a film sheet having a series of images recorded on one side of the film sheet and a non-image area on the same side;

an index print sheet having a series of pictures printed on one side of the index print sheet which match the series of images recorded on the film sheet and a non-picture area on the same side of the index print sheet in the same relative location as the non-image area on the film sheet and being sized to permit the film sheet to be placed over the non-picture area without covering any of the pictures; and holding means on the non-picture area of the index print sheet for securing the film sheet to the index print sheet, but permitting the film sheet to be released in order to separate it from the index print sheet.

DETAILED DESCRIPTION OF THE INVENTION

The invention is disclosed as being embodied preferably in a film sheet and an index print sheet. Because the features of a film sheet and an index print sheet are generally known, the description which follows is directed in particular only to those elements forming part of or cooperating directly with the disclosed embodiment. It is to be understood, however, that other elements may take various forms known to a person of ordinary skill in the art.

Figure 1:
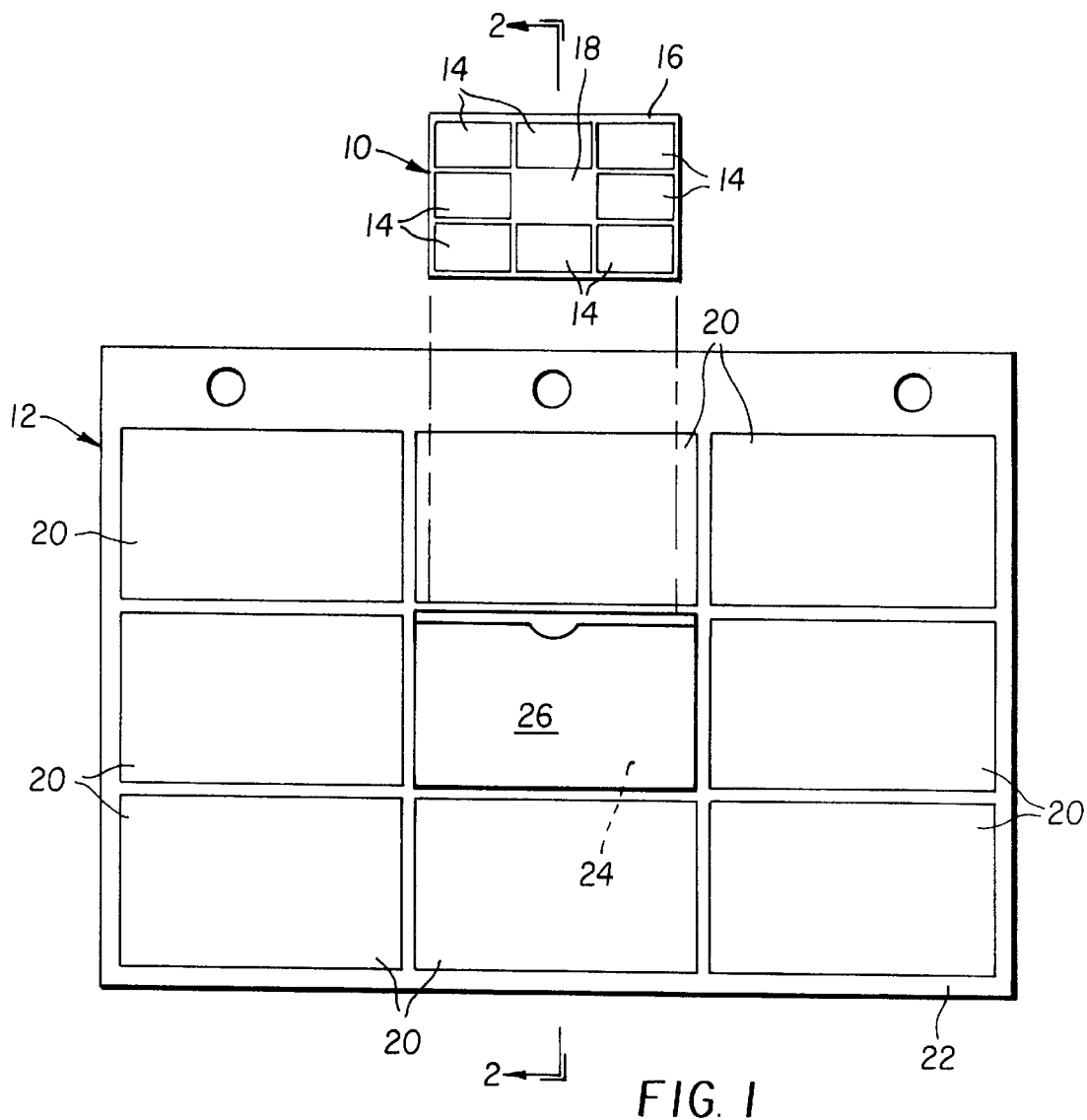
FIG. 1 is a plan view of an index print sheet and a film sheet consistent with a preferred embodiment of the invention.
Figure 2:
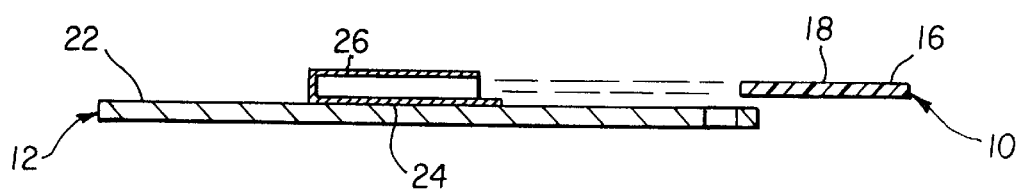
FIG. 2 is a cross-section view of the index print sheet and the film sheet as seen in the direction of the arrows 2 in FIG. 1.

Referring now to the drawings, FIGS. 1 and 2 show a film sheet 10 and an index print sheet 12 which further is a film storing sheet.

The film sheet 10 has a series of developed negative images 14 recorded on one side 16 of the film sheet and a non-image (clear) area 18 on the same side. The non-image area 18 is centered on the one side 16 and the negative images 14 are arranged on the same side around the non-image area. See FIG. 1.

The index print sheet 12 has a series of pictures or positive images 20 printed on one side 22 of the index print sheet which match the series of negative images 14 recorded on the film sheet 10 and a non-picture (clear) area 24 on the same side of the index print sheet which is in the same relative location as the non-image area 18 on the film sheet and is sized to permit the film sheet to be placed over the non-picture area without covering any of the pictures. See FIG. 1. The non-picture area 24 is centered on the one side 22 of the index print sheet 12 and the pictures 20 are arranged on the same side around the non-picture area.

The non-image area 18 of the film sheet 10 and the non-picture area 24 of the index print sheet 12 have an identical aspect ratio. See FIG. 1.

An envelope 26 is attached to the non-picture area 24 of the index print 12 to hold the film sheet 10 as shown in FIGS. 1 and 2, but permits the film sheet to be removed to separate it from the index print sheet. Alternatively, various other known means can be used to secure the film sheet 10 to the index print sheet 12 at the non-picture area 24 rather than the envelope 26. For example, instead of the envelope 26, a transparent sleeve or edge mounts could be used.

The invention has been described with reference to a preferred embodiment. However, it will be appreciated that variations and modifications can be effected by a person of ordinary skill in the art without departing from the scope of the invention.

PARTS LIST 10. film sheet
12. index print sheet
14. negative images
16. one side of the film sheet
18. non-image area
20. pictures
22. one side of the index print sheet
24. non-picture area
26. envelope

I claim:

1. A film package comprising:

a film sheet having a series of images recorded on one side of the film sheet and a non-image area on the same side;

an index print sheet having a series of pictures printed on one side of the index print sheet which match the series of images recorded on said film sheet and a non-picture area on the same side of the index print sheet in the same relative location as said non-image area on the film sheet and being sized to permit the film sheet to be placed over said non-picture area without covering any of the pictures; and holding means on said non-picture area of the index print sheet for securing said film sheet to said index print sheet, but permitting the film sheet to be released in order to separate it from the index print sheet.

2. A film package as recited in claim 1, wherein said non-image area is centered on the one side of said film sheet and the images are arranged on the same side around the non-image area, and said non-picture area is centered on the one side of said index print sheet and the pictures are arranged on the same side around the non-picture area.

3. A film package as recited in claim 1, wherein said non-image area of the film sheet and said non-picture area of the index print sheet have an identical aspect ratio.

* * * * *